Oct. 1, 1963
J. J. AMODEI
3,105,913
CIRCUIT, INCLUDING POSITIVE AND NEGATIVE RESISTANCE ACTIVE ELEMENTS, WHICH EXHIBITS REDUCED HYSTERESIS
Filed May 17, 1960
2 Sheets-Sheet 1

INVENTOR.
Juan J. Amodei
BY John V. Regan
Attorney

INVENTOR.
Juan J. Amodei
BY John V. Regan
Attorney

United States Patent Office 3,105,913

Patented Oct. 1, 1963

3,105,913

CIRCUIT, INCLUDING POSITIVE AND NEGATIVE RESISTANCE ACTIVE ELEMENTS, WHICH EXHIBITS REDUCED HYSTERESIS

Juan J. Amodei, Levittown, Pa., assignor to Radio Corporation of America, a corporation of Delaware Filed May 17, 1960, Ser. No. 29,746
6 Claims. (Cl. 307—88.5)

The objective of this invention is to provide a simple two-state circuit with a controllable amount of hysteresis. The invention is particularly useful in logic circuits in computers; however, it is not restricted to this use.

The circuit of the invention includes an active element having two positive resistance operating regions and a negative resistance operating region between the two positive resistance regions. The element can be switched from one positive resistance region through the negative resistance region to the other positive resistance region but it exhibits a substantial amount of hysteresis in switching between the positive regions. A positive resistance active element is connected to the negative resistance element in such manner that the combined characteristic of current versus voltage for the two elements has two positive resistance operating regions and a region between the two which has a substantially lower "peak-to-valley" ratio than the negative resistance element alone. The peak of the characteristic can be made equal to the valley of the characteristic in which case the hysteresis exhibited will be zero; however, according to an important feature of the invention, the peak-to-valley ratio and accordingly the hysteresis can easily be controlled.

In a preferred form of the invention, the negative resistance element comprises a tunnel diode. The positive resistance active element comprises a transistor. The tunnel diode is connected to the emitter of the transistor and in parallel with the emitter-to-base diode. A forward bias voltage is applied to the base of the transistor. The value of this forward bias voltage determines the peak-to-valley ratio of the combined circuit looking into the emitter of the transistor.

The invention is described in greater detail in the discussion which follows and in the accompanying drawing in which.

Figure 1:
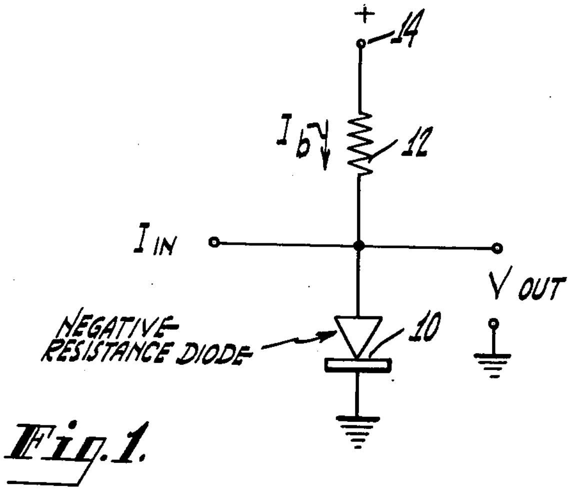
FIG. 1 is a schematic circuit diagram of a conventional negative resistance diode circuit.

The circuit of FIG. 1 includes a tunnel diode 10 connected through a resistor 12 to a source of voltage which is indicated schematically by the plus (+) sign applied to terminal 14. The value of resistance 12 is relatively large compared to that of the tunnel diode when in either of its stable states so that the source and resistor 12 together can be considered a constant current source.

Figure 2:
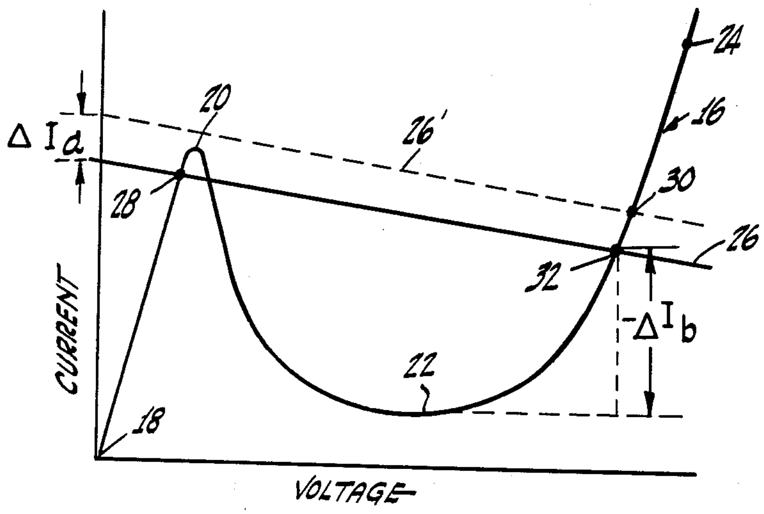
FIG. 2 is a characteristic curve of current versus voltage for the circuit of FIG. 1.

The characteristic of current versus voltage for the tunnel diode 10 is shown at 16 in FIG. 2. As is well understood, there are two positive resistance operating regions, namely 18, 20 and 22, 24 and a negative resistance operating region 20, 22. The load line for the resistor 12 is as indicated at 26. If the diode is quiescently biased by the voltage source 14 to operate at point 28 in its low voltage state, a small positive current pulse $\Delta I_a$ will cause the load line to shift to 26′. There is now only one stable intersection between load line 26′ and curve 16 and that is at 30. Accordingly, the diode rapidly switches from operating point 28 to operating point 30. When the input current pulse is removed, the diode remains in the high voltage state and its operating point is at 32.

It may be observed in FIG. 2 that when the diode is quiescently biased close to the current peak 20, a relatively small current increment is all that is required to switch the diode to the high state. However, if as in the case of many logic circuits, it is desired to reset the diode, that is, return it to its initial operating point 28, a relatively large current pulse $-\Delta I_b$ must be applied. This current pulse must have an amplitude sufficient to change the operating point from 32 to beyond the valley 22 of the characteristic. The hysteresis area in this case includes the points on the diode characteristic from 22 to 32.

In many circuit applications it is desirable to be able to control the amount of hysteresis in a two state circuit such as the tunnel diode circuit just described. Ideally, in certain applications, the hysteresis should be zero and also the circuit should automatically reset to its original state after being switched from one state to another. The circuit of FIG. 3 accomplishes these objectives. This circuit includes a negative resistance diode 34 connected through a resistor 36 to terminal 48. A voltage source may be connected to this terminal as indicated by the plus (+) symbol.

The anode of the tunnel diode is connected to the emitter 40 of a transistor 42. The transistor is of PNP type so that it may be said that the tunnel diode is connected in parallel with the emitter 40-to-base 44 diode of the transistor. The base of the transistor is forward biased by applying to it a voltage developed across a resistor 46 which is part of a voltage divider 46, 48. Terminal 50 of the voltage divider is connected to the negative terminal of a voltage source legended "E—," the other terminal thereof being grounded. One of the resistors 46 or 48 may be made variable. For the purposes of the present circuit, resistor 48 is shown as being variable. Capacitor 49 is merely a by-pass capacitor. A source of operating voltage indicated schematically by the minus (—) sign is connected from terminal 52 and through resistor 54 to the collector 56 of the transistor. The other terminal of this source of voltage is grounded. The output of the transistor may be taken at terminals 58.

Figure 3:
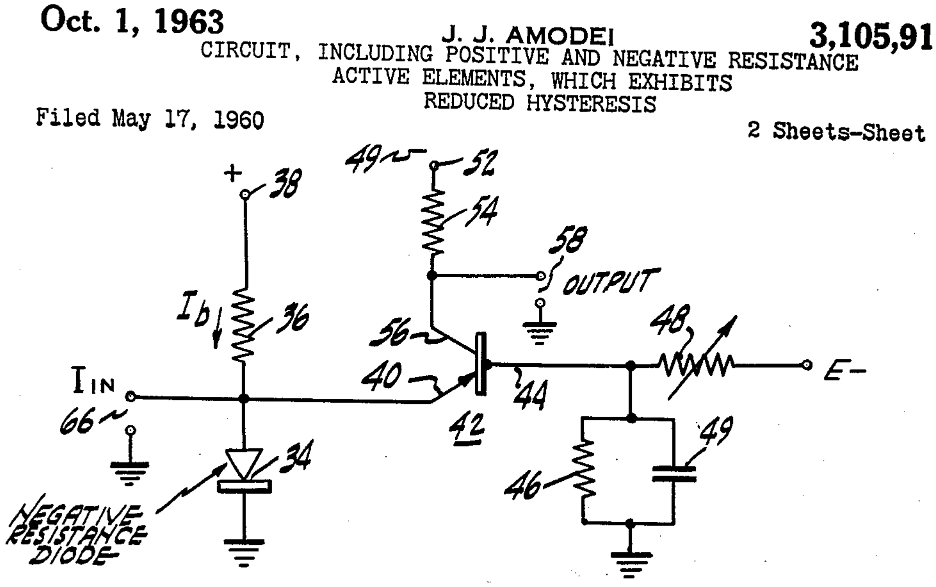
FIG. 3 is a schematic circuit diagram of a controllable hysteresis circuit according to the present invention.
Figure 4:
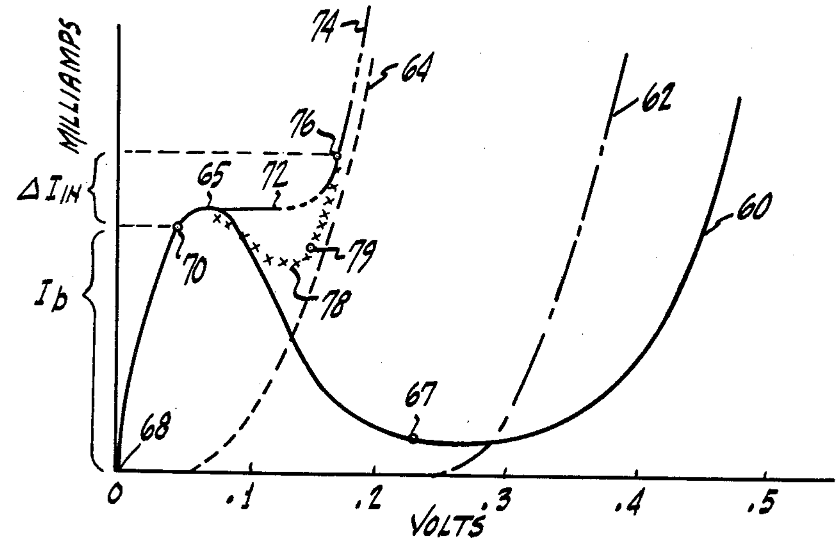
FIG. 4 is a characteristic curve of current versus voltage for elements in the circuit of FIG. 3.

The operation of the circuit of FIG. 3 may be better understood by referring to FIG. 4. Solid line curve 60 is the characteristic of current versus voltage for the tunnel diode 34 alone. Dot-dashed line 62 is the characteristic of current versus voltage looking into the emitter of transistor 42 without the tunnel diode 34 and without any bias on the base of the transistor. The effect of forward biasing the base of the transistor is to move curve 62 to the left as indicated at 64 so that it is in the same area as the negative resistance operating region 65, 67 of the diode 34. The tunnel diode is connected in parallel with the emitter-to-base diode of the transistor. Accordingly, the combined tunnel diode-emitter characteristic of the circuit of FIG. 3 looking into the circuit at input terminal 66 is as shown at 68, 70, 72, 74. The voltage at the tunnel diode anode is the same as that at the emitter and the input current is equal to the sum of the currents passing into the emitter and tunnel diode.

With the bias indicated applied, the hysteresis of the circuit is substantially eliminated. If the quiescent current $I_B$ is such that the operating point is at 70 and a small positive input pulse $\Delta I_{in}$ is applied, the operating point is switched to 76. When the input current $\Delta I_{in}$ is removed, the operating point drops back to 70. An important advantage of this circuit, aside from lack of hysteresis, is that the circuit automatically resets.

In certain applications it may be desired not to automatically reset the circuit. However, it may still be desired substantially to reduce the hysteresis. This can be done by decreasing the amount of forward bias voltage applied to the base of the transistor. The effect of this is to move curve 64 to the right and to produce a composite curve 68, 70, 78, 74. Note the peak 65 to valley 78 ratio of this composite curve is substantially less than the peak 65 to valley 67 ratio of the diode alone. A relatively small input current switches the tunnel diode from its low state to its high state but, after the diode switches, it remains in its high state as, for example, at 79.

A circuit according to the present invention may have the following values of circuit components. These values are merely illustrative of the invention and are not to be taken as limiting.

Transistor 42—Type 2N501
Current peak for tunnel diode 34=3 milliamperes
Bias voltage at the base 44=−78 millivolts It will be appreciated, of course, that an NPN rather than a PNP transistor can be used in the circuit of FIG. 3. In this case, the cathode of the tunnel diode is connected to the emitter of the transistor and a negative voltage source is connected to terminal 38. Likewise, a positive voltage source is connected to terminal 52 and a positive forward bias voltage is applied to the base of the transistor.

What is claimed is:

1. In combination, a first negative resistance active element having a current peak and a current valley in its current versus voltage characteristic; a positive resistance second active element effectively connected in shunt with the first active element; means for applying a quiescent bias to said two elements which is in the forward direction with respect to the second active element and is in the reverse direction with respect to the first active element to provide a combined current versus voltage characteristic in which the current peak to current valley ratio is substantially reduced; and means for applying a signal to both of said active elements.

2. In combination, a negative resistance element having a peak and a valley in one of the parameters current and voltage as a function of the other; a second element connected to the negative resistance and forming therewith a combined circuit; means for applying a bias to the two elements which tends to bias them in opposite directions for electronically shifting the current versus voltage characteristic of one of said elements with respect to the other in the direction of the axis of said other parameter for reducing the peak-to-valley ratio of said one parameter in the combined circuit; and means for applying a signal to said combined circuit.

3. In combination, a transistor; a tunnel diode connected like electrode to like electrode to the emitter-to-base diode of the transistor; means for applying a bias to the transistor which tends to bias the emitter-to-base diode of the transistor in the forward direction and the tunnel diode in the reverse direction; and means coupled to the emitter of the transistor for applying a signal thereto.

4. In combination, a transistor; a tunnel diode connected between the emitter of the transistor and a source of reference potential; an impedance connected between the base of the transistor and said source of reference potential; means connected to the base of the transistor for applying a direct, forward bias voltage to the base of the transistor which tends to bias the emitter-to-base diode in the forward direction and the tunnel diode in the reverse direction; and means for applying a signal between the emitter and base of said transistor.

5. In combination, a negative resistance first active element having a peak and a valley in its current versus voltage characteristic; a positive resistance second active element connected to the first active element; means for applying a direct voltage bias to the second active element which is in the forward direction with respect thereto but which is in the reverse direction with respect to the first active element to thereby substantially reduce the peak to valley ratio of the two elements; and means for applying a signal to both of said elements.

6. In combination, a first negative-resistance active element having a signal input terminal to which an input signal current is applied and which exhibits a current peak at one value of the voltage across the element and a current valley at another value of voltage across the element; a positive resistance second active element connected at one terminal to said input terminal of the first element and having a second terminal to which a direct voltage is applied which is in the forward direction with respect to the second element and in the reverse direction with respect to the first element, said second element, so biased, exhibiting a relatively low incremental resistance at a value of voltage slightly greater than that at which said current peak occurs and lower than that at which the voltage valley occurs, whreby the two elements, so biased, exhibit a combined current versus voltage characteristic in which the current peak to current valley ratio is substantially less than that of the two elements in the absence of the bias voltage.

References Cited in the file of this patent

UNITED STATES PATENTS 2,614,140 Kreer ------------------ Oct. 14, 1952

OTHER REFERENCES

"The Tunnel Diode-Circuits and Application," Electronics, Nov. 27, 1959 (pp. 62 relied on).

"Designing with Tunnel Diodes," part 2, Electronic Design, Feb. 17, 1960 (p. 66 relied on).

Digest of Technical Papers of the 1960 Solid-State Circuits Conference, first edition, Feb. 1960 (pp. 16 to 17 relied on).